US012630708B2

(12) United States Patent
Yamakita et al.

(10) Patent No.: US 12,630,708 B2

(45) Date of Patent: May 19, 2026

(54) EPOXY RESIN COMPOSITION, PREPREG, AND FIBER-REINFORCED COMPOSITE MATERIAL

(71) Applicant: Toray Industries, Inc., Tokyo (JP)

(72) Inventors: Yuichi Yamakita, Iyo-gun (JP); Daisuke Konishi, Nagoya (JP); Hideki Hanabusa, Iyo-gun (JP); Noriyuki Hirano, Nagoya (JP); Reo Takaiwa, Iyo-gun (JP)

(73) Assignee: Toray Industries, Inc., Tokyo (JP)

( * ) Notice: Subject to any disclaimer, the term of this patent is extended or adjusted under 35 U.S.C. 154(b) by 569 days.

(21) Appl. No.: 18/019,169

(22) PCT Filed: Aug. 6, 2021

(86) PCT No.: PCT/JP2021/029285

§ 371 (c)(1),
(2) Date: Feb. 1, 2023

(87) PCT Pub. No.: WO2022/039050

PCT Pub. Date: Feb. 24, 2022

(65) Prior Publication Data

US 2023/0279219 A1 Sep. 7, 2023

(30) Foreign Application Priority Data

Aug. 17, 2020 (JP) ................................ 2020-137258

(51) Int. Cl.

*C08L 63/00* (2006.01)
*C08J 3/28* (2006.01)
*C08J 5/24* (2006.01)

(52) U.S. Cl.

CPC ................ *C08L 63/00* (2013.01); *C08J 3/28* (2013.01); *C08J 5/246* (2021.05); *C08J 2363/00* (2013.01); *C08L 2205/03* (2013.01)

(58) Field of Classification Search

None

See application file for complete search history.

(56) References Cited

U.S. PATENT DOCUMENTS

2015/0065606 A1 3/2015 Matsuda et al.
2015/0210813 A1* 7/2015 Arai .................... C08K 5/1515 428/298.7
2016/0152819 A1* 6/2016 Balijepalli .............. C08J 3/247 523/400
2018/0186946 A1* 7/2018 Mori ...................... C08G 59/50
2019/0177470 A1* 6/2019 Sano ........................ C08K 5/09
2022/0177696 A1 6/2022 Konishi et al.

FOREIGN PATENT DOCUMENTS

JP 08301982 A 11/1996
JP 11172076 A 6/1999
JP 2010150401 A 7/2010
JP 2011052188 A 3/2011
JP 2011157491 A 8/2011
JP 2014167103 A 9/2014
WO 2013115152 A1 8/2013
WO 2020217894 A1 10/2020

OTHER PUBLICATIONS

International Search Report and Written Opinion for International Application No. PCT/JP2021/029285, dated Oct. 19, 2021, 6 pages.

* cited by examiner

*Primary Examiner* — Anthony J Frost

(74) *Attorney, Agent, or Firm* — Buchanan Ingersoll & Rooney PC

(57) ABSTRACT

An epoxy resin composition is provided that has an elastic modulus, deformability, fracture toughness, and heat resistance in good balance. A prepreg produced from the epoxy resin composition and a fiber-reinforced composite material produced by curing the prepreg are also provided, where the epoxy resin composition includes the components [A], [B], and [C] and satisfies all of the requirements (1), (2), and (3) as described.

7 Claims, No Drawings

EPOXY RESIN COMPOSITION, PREPREG, AND FIBER-REINFORCED COMPOSITE MATERIAL

CROSS REFERENCE TO RELATED APPLICATIONS

This is the U.S. National Phase application of PCT/JP2021/029285, filed Aug. 6, 2021 which claims priority to Japanese Patent Application No. 2020-137258, filed Aug. 17, 2020, the disclosures of these applications being incorporated herein by reference in their entireties for all purposes.

FIELD OF THE INVENTION

The present invention relates to an epoxy resin composition that can be used suitably as matrix resin in a fiber-reinforced composite material suitable for sport applications, general industry applications, and aerospace applications, and also relates to a prepreg and a fiber-reinforced composite material prepared by using it as matrix resin.

BACKGROUND OF THE INVENTION

Sheet-like molding materials for fiber-reinforced composite materials (prepregs) produced by impregnating reinforcing fibers with thermosetting resin are generally used for producing fiber-reinforced plastics. Moldings can be obtained by a method in which prepreg plies are laminated and heated to cure the thermosetting resin, and they have been applied to various fields such as production of aircraft and sports goods. As the thermosetting resin to serve as matrix resin in prepreg, epoxy resins have been widely used because of their high heat resistance, adhesiveness, and mechanical strength. In recent years, as the application of fiber-reinforced composite materials expands, members are now required to have diverse performance properties and high-performance epoxy resins are desired for preparation of these prepregs. Specifically, demands are growing for fiber-reinforced composite materials that serve for producing cured epoxy resins having enhanced elastic modulus, deformability, fracture toughness, and heat resistance, can be used at high temperatures, and have good mechanical properties and impact resistance.

In general, for the production of cured epoxy resins with high elastic modulus and heat resistance, a well-known method is to blend an epoxy resin having a plurality of functional groups, such as phenol novolac type epoxy resin and amine type epoxy resin. However, blending of these polyfunctional epoxy resins leads to cured epoxy resins with low deformability and fracture toughness, though it serves to obtain cured epoxy resins with high elastic modulus and heat resistance.

For the production of a cured epoxy resin with high deformability, a well-known method is to maintain the cross-linking density of the cured epoxy resin at a low degree. In addition, for the production of a cured epoxy resin with high fracture toughness, a well-known technique is to add rubber particles to the epoxy resin used to prepare the epoxy resin composition. However, cured epoxy resins prepared by applying the above technique have largely decreased heat resistance and elastic modulus, and therefore, there is a strong call for a technique that serves to produce cured epoxy resins that are high in elastic modulus, deformability, and fracture toughness, as well as heat resistance.

Patent document 1 discloses an epoxy resin composition that serves to produce a cured epoxy resin having deformability and fracture toughness. This is achieved by adding a particulate toughness improving agent to an epoxy resin composition that is designed to provide a cured epoxy resin with low cross-linking density.

Patent document 2 discloses an epoxy resin composition that serves to produce a cured epoxy resin having heat resistance and mechanical properties. This is achieved by adding a small amount of a polyfunctional aliphatic epoxy resin having a specific structure to an epoxy resin composition that is designed to provide a cured epoxy resin with high heat resistance.

Patent document 3 discloses an epoxy composition that serves to produce a cured epoxy resin having high heat resistance and fracture toughness. This is achieved by using an epoxy resin composition that is prepared by mixing an epoxy resin having a rigid backbone and a liquid rubber.

PATENT DOCUMENTS

Patent document 1: Unexamined Patent Publication (Kokai) No. HEI 11-172076

Patent document 2: Unexamined Patent Publication (Kokai) No. 2014-167103

Patent document 3: Unexamined Patent Publication (Kokai) No. HEI 8-301982

SUMMARY OF THE INVENTION

Although the epoxy resin composition described in Patent document 1 serves to produce a cured epoxy resin having deformability and fracture toughness, nothing is disclosed or suggested about allowing the cured epoxy resin to have increased heat resistance.

Although the epoxy resin composition described in Patent document 2 serves to produce a cured epoxy resin having high heat resistance and mechanical strength, the cured epoxy resin fails to have sufficient deformability. Furthermore, nothing is described about allowing the cured epoxy resin to have increased fracture toughness.

Although the epoxy resin composition described in Patent document 3 serves to produce a cured epoxy resin having high fracture toughness, the cured epoxy resin fails to have sufficient heat resistance, and there is no specific description about allowing the cured epoxy resin to have increased deformability.

The main object of the present invention is to eliminate such defects in the conventional techniques to provide an epoxy resin composition that serves to produce a cured epoxy resin having high elastic modulus, deformability, fracture toughness, and heat resistance in a good balance, and also provide a prepreg incorporating the epoxy resin composition and reinforcing fibers and a fiber-reinforced composite material with high heat resistance, mechanical properties, and impact resistance that is produced by curing the prepreg.

After making an intensive study aiming to solve the problems described above, the inventors of the present invention found an epoxy resin composition having the following constitution and arrived at the present invention on the basis of the finding. More specifically, the epoxy resin composition according to the present invention has the constitution described below.

The epoxy resin composition contains all of the following components [A], [B], and [C], and meets all of the following requirements (1), (2), and (3):

[A]: at least one epoxy resin selected from the group consisting of bisnaphthalene type epoxy resin, dicyclopentadiene type epoxy resin, biphenyl aralkyl type epoxy resin, and naphthalene aralkyl type epoxy resin,
[B]: core-shell type particulate rubber, and
[C]: dicyandiamide,
(1) the component [B] accounts for 6 to 18 parts by mass relative to the total quantity of epoxy resins, which accounts for 100 parts by mass,
(2) a cured epoxy resin produced by curing for 2 hours at 135° C. shows a rubbery state elastic modulus G' in the range of 8<G'<15 as determined by dynamic viscoelasticity analysis, and
(3) the cured epoxy resin produced by curing at 135° C. for 2 hours shows a tensile fracture strain of 7% or more.

Furthermore, the prepreg according to the present invention is a prepreg that includes the aforementioned epoxy resin composition and reinforcing fibers.

In addition, the fiber-reinforced composite material according to the present invention is a fiber-reinforced composite material that is obtained by curing the aforementioned prepreg.

The present invention can provide a cured epoxy resin having high elastic modulus, deformability, fracture toughness, and heat resistance in a good balance, and therefore, a fiber-reinforced composite material containing the epoxy resin composition according to the present invention as matrix resin can develop excellent mechanical properties, impact resistance, and heat resistance.

DETAILED DESCRIPTION OF EMBODIMENTS OF THE INVENTION

The epoxy resin composition according to the present invention contains the following as essential components: [A] at least one selected from the group consisting of bisnaphthalene type epoxy resin, dicyclopentadiene type epoxy resin, biphenyl aralkyl type epoxy resin, naphthalene aralkyl type epoxy resin, [B] core-shell type particulate rubber, and [C] dicyandiamide. First, these constituents are described below.

(Component [A])

The component [A] used for the present invention is at least one epoxy resin selected from the group consisting of bisnaphthalene type epoxy resin, dicyclopentadiene type epoxy resin, biphenyl aralkyl type epoxy resin, and naphthalene aralkyl type epoxy resin.

Commercial products of bisnaphthalene type epoxy resin include Epiclon® HP4700, HP4710, HP4770, and EXA4750 (all manufactured by DIC Corporation).

Commercial products of dicyclopentadiene type epoxy resin include Epiclon® HP7200L, HP7200, HP7200H, HP7200HH, and HP7200HHH (all manufactured by DIC Corporation), Tactix 558 (manufactured by Huntsman Advanced Materials Gmbh), and XD-1000 (manufactured by Nippon Kayaku Co., Ltd.).

Commercial products of biphenyl aralkyl type epoxy resin include NC-3000L, NC-3000, NC-3000H, and NC-3100 (all manufactured by Nippon Kayaku Co., Ltd.).

Commercial products of as naphthalene aralkyl type epoxy resin include NC-7000L and NC-7300L (both manufactured by Nippon Kayaku Co., Ltd.).

It is preferable that dicyclopentadiene type epoxy resin be used as the component [A] in an amount of 20 to 60 parts by mass relative to the total quantity of epoxy resins, which represents 100 parts by mass (requirement (a)). If its content is in the above range, it furthermore serves to provide a cured epoxy resin having heat resistance, deformability and fracture toughness in a good balance.

It is also preferable that bisnaphthalene type epoxy resin be used as the component [A] in an amount of 20 to 50 parts by mass relative to the total quantity of epoxy resins, which represents 100 parts by mass (requirement (b)). If its content is in the above range, it serves to provide a cured epoxy resin having similarly high deformability and fracture toughness, and a higher heat resistance.

(Component [B])

The component [B] used for the present invention is a core-shell type particulate rubber.

Here, particulate rubber is in the form of particles having rubber elasticity. The core-shell type particulate rubber is a kind of particulate rubber in which each core particle contains an elastomer as the primary component and the surface of the core is covered by a shell that contains a component differing from those in the core to ensure an increased compatibility with the matrix resin. The shell may cover the surface of the core either partly or completely. The rubber particles covered by a shell material can achieve better dispersion in the epoxy resin composition as compared with uncovered ones, thereby facilitating the production of a cured epoxy resin with a higher fracture toughness. There are no specific limitations on the materials of the cores and shells as long as they work as cores and shells properly.

Materials that can serve as the component [B] include Kane Ace® (MX-125, MX-150, MX-154, MX-257, MX-267, MX-416, MX-451, and MX-EXP (HM5) (all manufactured by Kaneka Corporation), and PARALOID® EXL-2655 and EXL-2668 (both manufactured by Dow Chemical). Some of these are in the form of a so-called master batch in which the main component is already dispersed in an epoxy resin.

(Component [C])

The component [C] used for the present invention is dicyandiamide.

Commercial products of the dicyandiamide include DICY7 and DICY15 (both manufactured by Mitsubishi Chemical Corporation).

It is preferable for the content of the component [C] contained here to meet the requirement of $0.95 \leq Ma/Mc \leq 1.05$ wherein Ma is the number of moles of active epoxy groups and Mc is the number of moles of active hydrogens in the component [C] in the total quantity of epoxy resins, which accounts for 100 parts by mass (requirement (d)). If the ratio between the number of moles of active epoxy groups and the number of moles of active hydrogens is in this range, it serves to provide a cured epoxy resin that is high in deformability, fracture toughness, and heat resistance. Here, the number of moles of active hydrogens in the component [C] is calculated by dividing the mass of the dicyandiamide component by the active hydrogen equivalent weight of dicyandiamide, which is equal to 12, whereas the number of moles of active epoxy groups in all the epoxy resins which account for 100 parts by mass, is the sum of the number of moles of active epoxy groups in each epoxy resin component and is calculated by the equation given below:

The number of moles of active epoxy groups in all the epoxy resins which account for 100 parts by mass=(mass of epoxy resin *A*/epoxy equivalent weight of epoxy resin *A*)+(mass of epoxy resin *B*/epoxy equivalent weight of epoxy resin *B*)+ . . . +(mass of epoxy resin *W*/epoxy equivalent weight of epoxy resin *W*).

If used in combination with a curing accelerator such as an aromatic urea compound, the component [C] can work to form an epoxy resin composition having a relatively low curing temperature as compared with the case where the component [C] is contained alone. Examples of the curing accelerator include, for example, 3-(3,4-dichlorophenyl)-1,1-dimethylurea (DCMU), 3-(4-chlorophenyl)-1,1-dimethylurea, phenyl dimethylurea (PDMU), and 2,4-toluene-bis(3,3-dimethylurea) (TBDMU). Furthermore, commercial products of these aromatic urea compounds include DCMU99 (manufactured by Hodogaya Chemical Industry Co., Ltd.), Omicure® U-24 (manufactured by PTI Japan Co., Ltd.), and Dyhard® UR505 (4,4'-methylene-bis(phenyl dimethylurea), manufactured by AlzChem).

Here, it is particularly preferable to use TBDMU as the curing accelerator. The combined use of the component [C] and TBDMU can serve to form a cured epoxy resin that is high in both heat resistance and tensile fracture strain.

For the present invention, the inclusion of all the components [A], [B], and [C] can serve to form a cured epoxy resin that has elastic modulus, deformability, fracture toughness, and heat resistance in a good balance and can also serve to form a resin composition with storage stability that is suitable for prepreg production.

It is essential for the epoxy resin composition according to the present invention to include the component [B] in an amount of 6 to 18 parts by mass relative to the total quantity of epoxy resins, which accounts for 100 parts by mass (requirement (1)). It is also essential that when cured for 2 hours at 135° C., the epoxy resin composition according to the present invention give a cured epoxy resin product having a rubbery state elastic modulus G' in the range of 8 MPa<G'<15 MPa as determined by dynamic viscoelasticity analysis (requirement (2)). Satisfying both the requirement (1) and the requirement (2) specified above serves to produce a cured epoxy resin that has high fracture toughness and deformability while showing high heat resistance required to suit applications in a variety of fields including sporting goods and industrial components. If the component [B] accounts for less than 6 parts by mass relative to the total quantity of epoxy resins, which accounts for 100 parts by mass, it will fail to have sufficient fracture toughness and deformability, whereas if the content is more than 18 parts by mass, the resulting cured epoxy resin will have a largely decreased elastic modulus, leading to a fiber-reinforced composite material having insufficient mechanical properties. If the rubbery state elastic modulus G' is 8 MPa or less, furthermore, it will fail to have a sufficient heat resistance, whereas if the rubbery state elastic modulus G' is 15 MPa or more, it will fail to have a sufficient deformability though having a high heat resistance.

For the present invention, the fracture toughness of a cured epoxy resin can be determined from the K1c value obtained from the SENB test described in ASTM D5045-99.

Furthermore, the deformability of a cured epoxy resin corresponds to the flexural fracture strain and tensile fracture strain of the cured epoxy resin.

The flexural modulus, flexural strength, and flexural fracture strain of a cured epoxy resin produced by curing the epoxy resin composition according to the present invention can be determined by, for example, performing the three point bending test according to JIS K7171 (1994).

Furthermore, the tensile fracture strain, tensile modulus, and tensile strength of a cured epoxy resin produced by curing the epoxy resin composition according to the present invention can be determined by preparing a dumbbell-like cured resin plate and examining it by the tensile test according to JIS K7161 (1994).

Here, the heat resistance of a cured epoxy resin corresponds to the glass transition temperature of the cured epoxy resin. The glass transition temperature and the rubbery state elastic modulus G' of the cured epoxy resin according to the present invention can be determined from a scatter diagram representing measurements of storage elastic modulus and temperature taken during the heating process of DMA measurement (dynamic viscoelasticity analysis) performed according to JIS K7095 (2018). The glass transition temperature of a cured epoxy resin is the temperature at which the tangent drawn in the glass region and the tangent drawn in the glass transition region intersect each other in the scatter diagram. In addition, the rubbery state elastic modulus G' of a cured epoxy resin is defined as the storage elastic modulus at a temperature that is higher by +50° C. than the glass transition temperature of the cured epoxy resin.

From the viewpoint of the balance between heat resistance and deformability, it is more preferable that when cured for 2 hours at 135° C., the epoxy resin composition according to the present invention give a cured epoxy resin product having a rubbery state elastic modulus G' in the range of 9 MPa<G'<13 MPa as determined by dynamic viscoelasticity analysis.

It is essential that a cured epoxy resin product produced by curing the epoxy resin composition according to the present invention for 2 hours at 135° C. show a tensile fracture strain of 7% or more (requirement (3)). Though there is no specific upper limit of the tensile fracture strain of the cured epoxy resin, it is about 20%. If the tensile fracture strain of the cured epoxy resin is smaller than 7%, a fiber-reinforced composite material containing the epoxy resin composition as matrix resin will have insufficient mechanical properties and impact absorption property.

It is preferable for the epoxy resin composition according to the present invention to contain a borate ester compound as component [D] in such a manner that it satisfies the requirement (c) specified below.

$$0.003 \leq (\text{number of parts by mass of component } [D] / \text{number of parts by mass of component } [B]) \leq 0.05 \quad \text{(c):}$$

If both the component [B] and the component [D] are contained simultaneously in this range, it serves to not only give an epoxy resin composition with a higher storage stability but also give a cured epoxy resin with a still higher fracture toughness.

Specific examples of the component [D] include alkyl borate esters such as trimethyl borate, triethyl borate, tributyl borate, tri-n-octyl borate, tri(triethylene glycol methyl ether) borate ester, tricyclohexyl borate, and trimenthyl borate; aromatic borate esters such as tri-o-cresyl borate, tri-m-cresyl borate, tri-p-cresyl borate, and triphenyl borate; and others such as tri(1,3-butanediol) biborate, tri(2-methyl-2,4-pentanediol) biborate, and trioctylene glycol diborate.

Useful borate esters also include a cyclic borate ester having a cyclic structure in its molecule. Examples of the cyclic borate ester include tris-o-phenylene bisborate, bis-o-phenylene pyroborate, bis-2,3-dimethylethylene phenylene pyroborate, and bis-2,2-dimethyltrimethylene pyroborate.

Commercial products that contain such borate esters include Cureduct® L-01B (manufactured by Shikoku Chemicals Corporation), Cureduct® L-07N (manufactured by Shikoku Chemicals Corporation) (a composition containing 5 mass % borate ester compound), and Cureduct® L-07E (manufactured by Shikoku Chemicals Corporation) (a composition containing 5 mass % borate ester compound).

It is preferable that in the epoxy resin composition according to the present invention, a difunctional aliphatic epoxy resin as represented by the following formula (I) be contained as component [F] at a content of 1 to 10 parts by mass, more preferably 3 to 7 parts by mass, relative to the total quantity of the epoxy resin composition, which accounts for 100 parts by mass. If the content is in this range, it serves to produce a cured epoxy resin having a still higher deformability without impairing the heat resistance of the cured epoxy resin.

[Chemical compound 1]

(I)

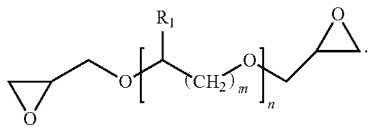

(In the formula (I), $R_1$ is a hydrogen atom or a methyl group, and n and m each represent an integer of 1 to 8.)

Examples of the component [F] include aliphatic epoxy resins such as ethylene glycol diglycidyl ether, propylene glycol diglycidyl ether, trimethylene glycol diglycidyl ether, and hexamethylene glycol diglycidyl ether.

Useful examples of ethylene glycol diglycidyl ether include DENACOL® EX-850, EX-851, and EX-821 (all manufactured by Nagase ChemteX Corporation). Useful examples of propylene glycol diglycidyl ether include DENACOL® EX-911, EX-941, and EX-920 (all manufactured by Nagase ChemteX Corporation), and Adeka Glycyrol® ED-506 (manufactured by Adeka Corporation). Useful examples of hexamethylene glycol diglycidyl ether include DENACOL® EX-212.

The epoxy resin composition used for the present invention may also contain an epoxy resin other than the components [A] and [F] to an extent not adversely affecting the effect of the present invention.

Other useful epoxy resins include, for example, bisphenol A type epoxy resin, bisphenol F type epoxy resin, phenol novolac type epoxy resin, cresol novolac type epoxy resin, biphenyl type epoxy resin, naphthalene type epoxy resin, and glycidyl amine type epoxy resin. These may be used singly or as a combination of a plurality thereof.

Commercial products of bisphenol A type epoxy resin include jER® 825, 827, 828, 1001, and 1004 (all manufactured by Mitsubishi Chemical Corporation).

Commercial products of bisphenol F type epoxy resin include jER® 806, 807, 4004P, 4005P, 4007P, and 4010P (all manufactured by Mitsubishi Chemical Corporation), Epotohto® YDF2001, YDF2004, and YDF2005RD (all manufactured by Tohto Kasei Co., Ltd.), and Epiclon® 830 and 835 (manufactured by DIC Corporation).

Commercial products of phenol novolac type epoxy resin include jER® 152 and 154 (both manufactured by Mitsubishi Chemical Corporation).

Commercial products of cresol novolac type epoxy resin include Epiclon® N660, 670, 690, and 695 (all manufactured by DIC Corporation).

Commercial products of biphenyl type epoxy resin include jER® YX4000 and YX4000H (both manufactured by Mitsubishi Chemical Corporation).

Commercial products of naphthalene type epoxy resin include Epiclon® HP4032, HP4032H, and HP4032SS (all manufactured by DIC Corporation).

Commercial products of glycidyl amine type epoxy resin include Sumiepoxy® ELM434, ELM100, and ELM120 (all manufactured by Sumitomo Chemical Co., Ltd.), Araldite® MY720, MY721, MY0500, MY0510, and MY0600 (all manufactured by Huntsman Advanced Materials Gmbh).

The epoxy resin composition according to the present invention may also contain a thermoplastic resin in order to control the viscoelasticity for producing a prepreg with improved tackiness and drape characteristics and to provide a cured epoxy resin with improved mechanical characteristics and fracture toughness. Examples of the thermoplastic resin include polyvinyl acetal resins such as polyvinyl formal and polyvinyl butyral, and others such as polyvinyl alcohol, phenoxy resin, polyamide, polyimide, polyvinyl pyrrolidone, polyethersulfone, and triblock copolymers.

For the present invention, it is preferable that a triblock copolymer be contained as component [E] and that it account for 2 to 10 parts by mass, particularly preferably 4 to 8 parts by mass, relative to the total quantity of epoxy resins, which accounts for 100 parts by mass. If a triblock copolymer is contained in this content range, the epoxy resin composition can give a cured epoxy resin having a still higher fracture toughness.

Examples of such a triblock copolymer include Nanostrength® E20, E40, M22N, M52N, and D51N (all manufactured by Arkema K.K.).

The prepreg according to the present invention is a prepreg that includes the aforementioned epoxy resin composition and reinforcing fibers.

There are no specific limitations on the reinforcing fibers to use for the present invention, and useful examples include glass fiber, carbon fiber, aramid fiber, boron fiber, alumina fiber, and silicon carbide fiber. Two or more of these fibers may be used as a mixture. The use of carbon fiber is preferable because it serves to produce lightweight and highly stiff fiber-reinforced composite materials.

Next, the fiber-reinforced composite material according to the present invention will be described below. The fiber-reinforced composite material according to the present invention is a fiber-reinforced composite material produced by curing the aforementioned prepreg. Specifically, the fiber-reinforced composite material according to the present invention is produced by laminating plies of prepreg that includes the epoxy resin composition according to the present invention and reinforcing fibers and then heating them for curing the resin. The use of this technique serves to produce a fiber-reinforced composite material that contains, as matrix resin, a cured epoxy resin prepared from the epoxy resin composition according to the present invention. The production method is described in detail below.

There are no specific limitations on the method to use for the preparation of the epoxy resin composition according to the present invention. For example, kneading may be performed by using a machine such as kneader, planetary mixer, three roll mill, and twin screw extruder, or manual mixing by using a beaker, spatula, etc. may be adopted if uniform kneading is possible. Then, the prepreg according to the present invention can be produced by impregnating a reinforcing-fiber base material with an epoxy resin composition prepared by a method as described above. Good techniques for the impregnation include the hot-melt process (dry process). The hot-melt process may include a step in which a heat-curable resin composition having a viscosity reduced by heating is used for direct impregnation of reinforcing fibers or a step in which an epoxy resin composition is first spread over pieces of release paper or the like to form film sheets, which are then laid on one surface or on both surfaces of a reinforcing fiber sheet, followed by applying pressure and heat to impregnate the reinforcing fibers with the resin. In performing this step, the fiber mass content in the prepreg can be controlled by changing the quantity of resin added to the release paper.

To laminate and mold prepreg piles when producing the fiber-reinforced composite material according to the present invention, techniques such as the press forming method, autoclave molding method, bag molding method, wrapping tape method, and internal pressure molding method can be used appropriately for applying heat and pressure.

Fiber-reinforced composite materials containing a cured epoxy resin produced from the epoxy resin composition according to the present invention together with reinforcing fibers can be adopted favorably for producing sporting goods, aerospace materials, and general industrial materials. More specifically, preferred sporting applications include golf shafts, fishing rods, tennis and badminton rackets. Preferred applications in the aerospace industry include primary structure members of aircraft such as main wing, tail wing, and floor beam, and secondary structure members such as interior materials. Furthermore, preferred general industrial applications include structural material of automobiles, bicycles, ships, and railroad vehicles.

EXAMPLES

The present invention is described below in more detail with reference to examples, but it should be noted that the invention is not limited to the embodiments described in these examples.

The components used in the examples are as described below.

<Materials Used>

Component [A]: at least one selected from the group consisting of bisnaphthalene type epoxy resin, dicyclopentadiene type epoxy resin, biphenyl aralkyl type epoxy resin, and naphthalene aralkyl type epoxy resin

[A]-1 Epiclon® HP4700 (bisnaphthalene type epoxy resin, average epoxy equivalent weight 165 g/eq, manufactured by DIC Corporation)

[A]-2 Epiclon® HP4770 (bisnaphthalene type epoxy resin, average epoxy equivalent weight 204 g/eq, manufactured by DIC Corporation)

[A]-3 Epiclon® HP7200 (dicyclopentadiene type epoxy resin, average epoxy equivalent weight 259 g/eq, manufactured by DIC Corporation)

[A]-4 Epiclon® HP7200HHH (dicyclopentadiene type epoxy resin, average epoxy equivalent weight 285 g/eq, manufactured by DIC Corporation)

[A]-5 EXA7200LL (dicyclopentadiene type epoxy resin, average epoxy equivalent weight 259 g/eq, manufactured by DIC Corporation)

[A]-6 NC-3000 (biphenyl aralkyl type epoxy resin, average epoxy equivalent weight 275 g/eq, manufactured by Nippon Kayaku Co., Ltd.)

[A]-7 NC-7300L (naphthalene aralkyl type epoxy resin, average epoxy equivalent weight 214 g/eq, manufactured by Nippon Kayaku Co., Ltd.)

Component [B] or material containing component [B]: a core-shell type particulate rubber ([B]-5) or a master batch prepared by dispersing a core-shell type particulate rubber in an epoxy resin other than the component [A] and the component [F] ([B]-1 to [B]-4)

[B]-1 Kane Ace® MX-125 (bisphenol A type epoxy resin 75 mass % as epoxy resin other than components [A] and [F], and styrene-butadiene based core-shell type particulate rubber 25 mass % as component [B])

[B]-2 Kane Ace® MX-150 (bisphenol A type epoxy resin 60 mass % as epoxy resin other than components [A] and [F], and butadiene based core-shell type particulate rubber 40 mass % as component [B])

[B]-3 Kane Ace® MX-267 (bisphenol F type epoxy resin 63 mass % as epoxy resin other than components [A] and [F], and butadiene based core-shell type particulate rubber 37 mass % as component [B])

[B]-4 Kane Ace® MX-EXP (HM5) (bisphenol A type epoxy resin 70 mass % as epoxy resin other than components [A] and [F], and core-shell type particulate rubber 30 mass % as component [B])

[B]-5 Stafiloid® IM101 (core-shell type particulate rubber) Note that “component [B] or material containing component [B]” is simply referred to as “material [B]” in Tables 1 to 3.

Component [C]: dicyandiamide

[C]-1 DICY7T (manufactured by Mitsubishi Chemical Corporation)

Material containing component [D]: a mixture of a borate ester compound as component [D] and an epoxy resin other than component [A] and component [F], etc.

[D]-1 Cureduct® L-07E (borate ester compound 5 mass % as component [D], bisphenol A type epoxy resin 90 mass % as epoxy resin other than components [A] and [F], and phenol novolac resin 5 mass % as other component)

Note that “material containing component [D]” is simply referred to as “material [D]” in Tables 1 and 2.

Component [E]: triblock copolymer

[E]-1 Nanostrength® M22N (M-B-M type block copolymer in which B is butyl acrylate (Tg: −54° C.) and M is a random copolymer chain of methyl methacrylate and polar acrylic monomer, manufactured by Arkema K.K.)

Component [F]: difunctional aliphatic epoxy resin

[F]-1 DENACOL® EX-821 (average epoxy equivalent weight 185 g/eq, manufactured by Nagase ChemteX Corporation)

[F]-2 Adeka Glycyrol® ED-506 (average epoxy equivalent weight 300 g/eq, manufactured by Adeka Corporation)

Epoxy resin other than component [A] and component [F]

jER® 828 (bisphenol A type epoxy resin, average epoxy equivalent weight 189 g/eq, manufactured by Mitsubishi Chemical Corporation)

jER® 1001 (bisphenol A type epoxy resin, average epoxy equivalent weight 475 g/eq, manufactured by Mitsubishi Chemical Corporation)

Epiclon® 830 (bisphenol F type epoxy resin, average epoxy equivalent weight 172 g/eq, manufactured by DIC Corporation)

Epotohto® YDF2001 (bisphenol F type epoxy resin, average epoxy equivalent weight 485 g/eq, manufactured by Tohto Kasei Co., Ltd.)

Epiclon® N740 (phenol novolac type epoxy resin, average epoxy equivalent weight 182 g/eq, manufactured by DIC Corporation)

Araldite® MY0600 (triglycidyl aminophenol, average epoxy equivalent weight 106 g/eq, manufactured by Huntsman Advanced Materials Gmbh)

Sumiepoxy® ELM434 (tetraglycidyl diaminodiphenylmethane, average epoxy equivalent weight 120 g/eq, manufactured by Sumitomo Chemical Co., Ltd.)

jER® 1031S (tetrakis phenol ethane type epoxy resin, average epoxy equivalent weight 169 g/eq, manufactured by Mitsubishi Chemical Corporation)

DENACOL® EX-201 (resorcinol type epoxy resin, average epoxy equivalent weight 117 g/eq, manufactured by Nagase ChemteX Corporation)

DENACOL® EX-411 (pentaerythritol type epoxy resin, average epoxy equivalent weight 229 g/eq, manufactured by Nagase ChemteX Corporation)

SR-14BL (1,4-butanediol diglycidyl ether, average epoxy equivalent weight 110 g/eq, manufactured by Sakamoto Yakuhin Kogyo Co., Ltd.)

EpicIon® HP4032H (naphthalene type epoxy resin, average epoxy equivalent weight 250 g/eq, manufactured by DIC Corporation)

Note that "epoxy resin other than component [A] and component [F]" is simply referred to as "other epoxy resin" in Tables 1 to 3.

Curing accelerator

Omicure® U-24 (2,4-toluene-bis(3,3-dimethylurea), manufactured by PTI Japan) DCMU99 (manufactured by Mitsubishi Chemical Corporation)

Thermoplastic resin other than component [E]

Vinylec® K (polyvinyl formal, manufactured by JNC)

Other components

Hycar CTBN1300×8 (carboxyl group terminated butadiene-nitrile rubber, manufactured by Ube Industries, Ltd.)

<Preparation Method for Epoxy Resin Composition>

Predetermined quantities of the components other than [C] dicyandiamide, [D] borate ester compound, and the curing accelerator were put in a stainless steel beaker, heated to 60° C. to 150° C., and kneaded appropriately until all components were mixed completely, followed by cooling to 60° C. [D] borate ester compound was added as appropriate in each example, followed by kneading for 30 minutes to prepare the main component. Elsewhere, predetermined quantities of either jER® 828 or Epiclon® 830 and [C] dicyandiamide were put in a polyethylene cup, and the mixture was passed twice between the rolls of a three roll mill to prepare a dicyandiamide master batch. The main component and the dicyandiamide master batch prepared above were mixed so that they would account for predetermined proportions and kneaded at 60° C. or, followed by adding a curing accelerator and kneading at 60° C. for 30 minutes to prepare an epoxy resin composition. The components used to prepare an epoxy resin composition in each example are shown in Tables.

<Evaluation Method for Flexural Properties of Cured Epoxy Resin>

An uncured epoxy resin composition was defoamed in a vacuum and cured at a temperature of 135° C. for 2 hours in a mold having a 2 mm thick spacer of Teflon® set to produce a plate with a thickness of 2 mm, thus providing a cured resin plate with a thickness of 2 mm. A test piece having a width of 10 mm and a length of 60 mm was cut out from the cured epoxy resin plate obtained above, and three point bending test was conducted by using an Instron type universal tester (manufactured by Instron Corporation) under the conditions of a span of 32 mm and a crosshead speed of 10 mm/minute according to JIS K7171 (1994) to determine the flexural modulus, flexural strength, and flexural strain. For this test, six samples (n=6) were examined and the averages of the measurements taken were adopted to represent the flexural modulus and flexural strength.

<Evaluation Method for Tensile Properties of Cured Epoxy Resin>

An uncured epoxy resin composition was defoamed in a vacuum and cured at a temperature of 135° C. for 2 hours in a mold having a 2 mm thick spacer of Teflon® set to produce a product with a thickness of 2 mm, thus providing a cured resin plate with a thickness of 2 mm. The cured epoxy resin obtained above was cut into a 1BA type dumbbell-shaped specimen as specified in JIS K7161 (1994). Using an Instron type universal tester (manufactured by Instron Corporation) with a chuck distance set to 58 mm, tensile test was performed at a test speed of 1 mm/min to determine the tensile modulus, tensile strength, and tensile fracture strain. For this test, eight samples (n=8) were examined and the averages of the measurements taken were adopted to represent the tensile modulus, tensile strength, and tensile fracture strain.

<Evaluation Method for Fracture Toughness of Cured Epoxy Resin>

An uncured epoxy resin composition was defoamed in a vacuum and cured at a temperature of 135° C. for 2 hours in a mold having a 6 mm thick spacer of Teflon® set to produce a plate with a thickness of 6 mm, thus providing a cured resin plate with a thickness of 6 mm. The cured epoxy resin obtained above was cut into a test piece shape as specified in ASTM D5045-99 and applied to SENB test according to ASTM D5045-99. For this test, 16 samples (n=16) were examined and the average of the measurements was adopted as the K1c value.

<Evaluation Method for Glass Transition Temperature and Rubbery State Elastic Modulus G' of Cured Epoxy Resin>

An uncured resin composition was defoamed in a vacuum and cured at a temperature of 135° C. for 2 hours in a mold having a 2 mm thick spacer of Teflon® set to produce a plate with a thickness of 2 mm, thus providing a cured resin plate with a thickness of 2 mm. According to JIS K7095 (2018), a test piece with a width of 12.7 mm and a length of 45 mm was cut out from this cured epoxy resin and subjected to dynamic viscoelasticity analysis performed over the temperature range from 40° C. to 260° C. under the conditions of a temperature ramp rate of 5° C./min, a frequency of 1 Hz, and a strain of 0.08% using a dynamic viscoelasticity measuring instrument (ARES W/FCO, manufactured by TA Instrument) equipped with a solid twisting jig to hold the test piece. Here, according to JIS K7095 (2018), the glass transition temperature was assumed to be the temperature where the tangent drawn to the glass region and the tangent drawn to the glass transition temperature region intersect each other in the graph (scatter diagram) between storage elastic modulus and temperature obtained from this test. The rubber state elastic modulus G' was assumed to be the storage elastic modulus at a temperature higher by +50° C. than the glass transition temperature in the graph (scatter diagram) between storage elastic modulus and temperature obtained above. This evaluation test was performed using one sample (n=1).

Example 1

Using 50 parts by mass of NC-3000 (biphenyl aralkyl type epoxy resin) as epoxy resin of the component [A], 25 parts by mass of jER® 828 (bisphenol A type epoxy resin)

as epoxy resin other than the component [A] and the component [F], 10 parts by mass of Epiclon® N740 (phenol novolac type epoxy resin) as epoxy resin other than the component [A] and the component [F], 25 parts by mass of Kane Ace® MX-150 as the material [B] containing a core-shell type particulate rubber (10 parts by mass of the core-shell type particulate rubber of the component [B] and 15 parts by mass of bisphenol A type epoxy resin as epoxy resin other than the component [A] and the component [F]), 5.0 parts by mass of DICY7T as dicyandiamide, and 2 parts by mass of Omicure® U-24 as curing accelerator, an epoxy resin composition was prepared according to the <Preparation method for epoxy resin composition> described above.

A cured epoxy resin was prepared by a reaction performed at 135° C. for 2 hours and evaluated according to the <Evaluation method for glass transition temperature and rubbery state elastic modulus G' of cured epoxy resin>, and results showed that it had a glass transition temperature of 145° C. and a rubbery state elastic modulus G' of 8.9 MPa.

A cured epoxy resin was prepared by reacting the epoxy resin composition at 135° C. for 2 hours and its flexural properties were determined by the <Evaluation method for flexural properties of cured epoxy resin>. Results showed that it had a flexural modulus of 2.7 GPa, a flexural strength of 115 MPa, and a flexural fracture strain of 11%. In addition, a cured epoxy resin was prepared by a reaction performed at 135° C. for 2 hours and its tensile properties were determined by the <Evaluation method for tensile properties of cured epoxy resin>. Results showed that it had a tensile modulus of 2.7 GPa, a tensile strength of 59 MPa, and a tensile fracture strain of 7.2%, thus proving that it had a high deformability.

Furthermore, a cured epoxy resin was prepared by a reaction performed at 135° C. for 2 hours and its fracture toughness was determined by the <Evaluation method for fracture toughness of cured epoxy resin> described above. Results showed that it had a high fracture toughness of 1.7 MPa·m$^{0.5}$.

Examples 2 to 16

Except for using the components for epoxy resin compositions specified in Table 1 or Table 2, epoxy resin compositions and cured epoxy resins were prepared by the same procedure as in Example 1. For the cured epoxy resin prepared by curing each epoxy resin composition specified in Table 1 or Table 2, the rubbery state elastic modulus G' was determined by the same procedure as in Example 1. In all Examples, the cured epoxy resin prepared from each epoxy resin composition had a rubbery state elastic modulus G' in the range of $8\ \text{MPa} < G' < 15\ \text{MPa}$.

For the epoxy resin compositions prepared in the Examples, evaluation results showed that they realized good physical properties in all the evaluation items of flexural properties, tensile properties, fracture toughness, and heat resistance.

Comparative Example 1

According to the resin composition specification shown in Table 3, an epoxy resin composition was prepared by the procedure described in the Example 5 given in Patent document 1 (Japanese Unexamined Patent Publication (Kokai) No. HEI-11-172076). The epoxy resin composition contains the component [B] and the component [C], but does not contain the component [A]. A cured epoxy resin was prepared and its glass transition temperature and rubbery state elastic modulus G' were determined according to the same procedure as in Example 1, and results showed that the rubbery state elastic modulus G' was 5.9 MPa, which fails to satisfy the requirement (2), and that the glass transition temperature was a low 119° C.

Furthermore, its fracture toughness was determined by the <Evaluation method for fracture toughness of cured epoxy resin> described above, and results showed that it was 1.6 MPa·m$^{0.5}$. Its flexural properties were determined by the <Evaluation method for flexural properties of cured epoxy resin> described above. Results showed that it had a flexural modulus of 3.3 GPa, a flexural strength of 143 MPa, and a flexural fracture strain of 13%. In addition, its tensile properties were determined by the <Evaluation method for tensile properties of cured epoxy resin> described above, and results showed that it had a tensile modulus of 3.3 GPa, a tensile strength of 64 MPa, and a tensile fracture strain of 10.0%.

Comparative Example 2

According to the resin composition specification shown in Table 3, an epoxy resin composition was prepared by the procedure described in the Example 7 given in Patent document 2 (Japanese Unexamined Patent Publication (Kokai) No. 2014-167103). Then, a cured epoxy resin was prepared and its flexural properties, tensile properties, fracture toughness, glass transition temperature, and rubbery state elastic modulus G' were determined according to the same procedure as in Comparative example 1. The epoxy resin composition contains the component [A] and the component [C], but does not contain the component [B], and accordingly, it led to an insufficient fracture toughness and a low tensile fracture strain.

Comparative Example 3

According to the resin composition specification shown in Table 3, an epoxy resin composition was prepared by the procedure described in the Example 2 given in Patent document 3 (Japanese Unexamined Patent Publication (Kokai) No. HEI-8-301982). Then, a cured epoxy resin was prepared and its flexural properties, tensile properties, fracture toughness, glass transition temperature, and rubbery state elastic modulus G' were determined according to the same procedure as in Comparative example 1. The epoxy resin composition contains the component [A] and the component [C], but does not contain the component [B]. Instead, it contains a carboxyl group terminated butadiene-nitrile rubber as a toughness improver. A cured epoxy resin was prepared and found to have a rubbery state elastic modulus G' of 5.3 MPa, which fails to satisfy the requirement (2), and a low glass transition temperature of 134° C. In addition, it had an insufficient fracture toughness of 1.4 MPa·m$^{0.5}$ and a low tensile fracture strain of 5.1%.

Comparative Example 4

According to the resin composition specification shown in Table 3, an epoxy resin composition was prepared by the same procedure as in Example 1. Then, a cured epoxy resin was prepared and its flexural properties, tensile properties, fracture toughness, glass transition temperature, and rubbery state elastic modulus G' were determined according to the same procedure as in Comparative example 1.

The epoxy resin composition contains the component [A] and the component [C], but does not contain the component

[B]. The epoxy resin composition led to a low fracture toughness of 0.8 MPa·m$^{0.5}$ and a low tensile fracture strain of 2.9%.

Comparative Example 5

According to the resin composition specification shown in Table 3, an epoxy resin composition was prepared according to the same procedure as in Example 1. Then, a cured epoxy resin was prepared and its flexural properties, tensile properties, fracture toughness, glass transition temperature, and rubbery state elastic modulus G' were determined according to the same procedure as in Comparative example 1.

The epoxy resin composition contains the component [B], but it accounts for only 4 parts by mass and does not satisfy the requirement (1). The epoxy resin composition led to an insufficient fracture toughness of 1.3 MPa·m$^{0.5}$ and a low tensile fracture strain of 5.0%.

Comparative Example 6

According to the resin composition specification shown in Table 3, an epoxy resin composition was prepared according to the same procedure as in Example 1. Then, a cured epoxy resin was prepared and its flexural properties, tensile properties, fracture toughness, glass transition temperature, and rubbery state elastic modulus G' were determined according to the same procedure as in Comparative example 1.

The epoxy resin composition contains the component [B], but it accounts for as large as 20 parts by mass and does not satisfy the requirement (1). Although the epoxy resin composition led to a high fracture toughness of 1.6 MPa·m$^{0.5}$, it led to a low flexural modulus and a low tensile modulus of 2.2 GPa and 2.1 GPa, respectively, and also led to an insufficient fracture strain of 5.7%.

Comparative Example 7

According to the resin composition specification shown in Table 3, an epoxy resin composition was prepared according to the same procedure as in Example 1. Then, a cured epoxy resin was prepared and its flexural properties, tensile properties, fracture toughness, glass transition temperature, and rubbery state elastic modulus G' were determined according to the same procedure as in Comparative example 1.

The epoxy resin composition led to a rubbery state elastic modulus G' of 6.7 MPa, which fails to satisfy the requirement (2). The epoxy resin composition also led to an insufficient glass transition temperature of 130° C.

Comparative Example 8

According to the resin composition specification shown in Table 3, an epoxy resin composition was prepared according to the same procedure as in Example 1. Then, a cured epoxy resin was prepared and its flexural properties, tensile properties, fracture toughness, glass transition temperature, and rubbery state elastic modulus G' were determined according to the same procedure as in Comparative example 1.

The epoxy resin composition led to a rubbery state elastic modulus G' of 17.1 MPa, which fails to satisfy the requirement (2). The epoxy resin composition led to a high glass transition temperature of 163° C., but led to an insufficient fracture toughness of 1.4 MPa·m$^{0.5}$ and a low tensile fracture strain of 3.4%.

Comparative Example 9

According to the resin composition specification shown in Table 3, an epoxy resin composition was prepared according to the same procedure as in Example 1. Then, a cured epoxy resin was prepared and its flexural properties, tensile properties, fracture toughness, glass transition temperature, and rubbery state elastic modulus G' were determined according to the same procedure as in Comparative example 1.

The epoxy resin composition contains the components [B] and [C], but does not contain the component [A]. The epoxy resin composition led to a high glass transition temperature of 153° C., but since it did not contain the component [A], the rubbery state elastic modulus G' was as high as 20.2 MPa and failed to satisfy the requirement (2). The epoxy resin composition led to an insufficient fracture toughness of 1.4 MPa·m$^{0.5}$ and a low tensile fracture strain of 3.6%.

Comparative Example 10

According to the resin composition specification shown in Table 3, an epoxy resin composition was prepared according to the same procedure as in Example 1. Then, a cured epoxy resin was prepared and its flexural properties, tensile properties, fracture toughness, glass transition temperature, and rubbery state elastic modulus G' were determined according to the same procedure as in Comparative example 1.

The epoxy resin composition led to a rubbery state elastic modulus G' of 6.8 MPa, which fails to satisfy the requirement (2). The epoxy resin composition also led to an insufficient glass transition temperature of 133° C.

TABLE 1

| | | | | Example 1 | Example 2 | Example 3 | Example 4 |
|---|---|---|---|---|---|---|---|
| Epoxy resin composition | component [A] | Epiclon ®HP4700 | bisnaphthalene type epoxy resin | | | 10 | |
| | | Epiclon ®HP4770 | bisnaphthalene type epoxy resin | | | | |
| | | Epiclon ®HP7200 | dicyclopentadiene type epoxy resin | | | 30 | |
| | | Epiclon ®HP7200HHH | dicyclopentadiene type epoxy resin | | | | 70 |
| | | NC-3000 | biphenyl aralkyl type epoxy resin | 50 | | | |
| | | NC-7300L | naphthalene aralkyl type epoxy resin | | 55 | | |
| | other epoxy resin | jER ®828 | bisphenol A type epoxy resin | 25 | | 6 | 15 |
| | | jER ®1001 | | | | | |
| | | Epiclon ®830 | bisphenol F type epoxy resin | | 12 | 20 | |
| | | Epiclon ®N740 | phenol novolac type epoxy resin | 10 | 15 | 10 | |
| | component [F] | DENACOL ®EX821 | polyethylene glycol type epoxy resin | | | | |
| | material [B] | Kane Ace ®MX-125 master batch containing 25 mass % core-shell type particulate rubber | component [B]: core-shell type particulate rubber | | 6 | | |
| | | | bisphenol A type epoxy resin | | 18 | | |
| | | Kane Ace ®MX-150 master batch containing | component [B]: core-shell type particulate rubber | 10 | | 16 | 10 |

TABLE 1-continued

| | | | | | | | |
|---|---|---|---|---|---|---|---|
| | | 40 mass % core-shell type particulate rubber | bisphenol A type epoxy resin | 15 | | 24 | 15 |
| | | Kane Ace ®MX-267 master batch containing 37 mass % core-shell type particulate rubber | component [B]: core-shell type particulate rubber bisphenol F type epoxy resin | | | | |
| | component [C] | DICY7T | dicyandiamide | 5.0 | 6.5 | 6.0 | 4.5 |
| | curing accelerator | Omicure ®U-24 | toluene bisdimethylurea | 2 | 2 | 2 | 2 |
| | material [D] | Cureduct ®L-07E | component [D]: borate ester compound | | | | |
| | | | bisphenol A type epoxy resin | | | | |
| | | | phenol novolac resin | | | | |
| | thermoplastic resin | Vinylec ®K | polyvinyl formal | 3 | 3 | 3 | 2 |
| | | Nanostrength ®M22N | component (E): triblock copolymer | | | | |
| | number of moles of active groups in epoxy resin/number of moles of active hydrogens in component [C] | | | 0.93 | 1.07 | 0.99 | 0.93 |
| | number of parts by mass of component [D]/number of parts by mass of component [B] | | | — | — | — | — |
| Physical properties of cured resin | flexural modulus (GPa) | | | 2.7 | 2.8 | 2.5 | 2.6 |
| | flexural strength (MPa) | | | 115 | 119 | 102 | 112 |
| | flexural fracture strain (%) | | | 11 | 11 | 12 | 13 |
| | tensile modulus (GPa) | | | 2.7 | 2.8 | 2.5 | 2.6 |
| | tensile strength (MPa) | | | 59 | 63 | 53 | 57 |
| | tensile fracture strain (%) | | | 7.2 | 7.3 | 7.8 | 7.3 |
| | resin toughness K1c (MPa · $m^{1/2}$) | | | 1.7 | 1.6 | 1.7 | 1.7 |
| | glass transition temperature (° C.) | | | 145 | 150 | 148 | 151 |
| | rubber region G' (MPa) | | | 8.9 | 10.7 | 12.1 | 8.1 |
| | | | | Example 5 | Example 6 | Example 7 | Example 8 |
| Epoxy resin composition | component [A] | Epiclon ®HP4700 | bisnaphthalene type epoxy resin | | | | 25 |
| | | Epiclon ®HP4770 | bisnaphthalene type epoxy resin | 50 | | | |
| | | Epiclon ®HP7200 | dicyclopentadiene type epoxy resin | | | | |
| | | Epiclon ®HP7200HHH | dicyclopentadiene type epoxy resin | | 30 | 30 | |
| | | NC-3000 | biphenyl aralkyl type epoxy resin | | | | |
| | | NC-7300L | naphthalene aralkyl type epoxy resin | | | | |
| | other epoxy resin | jER ®828 | bisphenol A type epoxy resin | 25 | 15.9 | 16 | 30 |
| | | jER ®1001 | | | | | 10 |
| | | Epiclon ®830 | bisphenol F type epoxy resin | | 20 | 20 | 8 |
| | | Epiclon ®N740 | phenol novolac type epoxy resin | 10 | 10 | 10 | |
| | component [F] | DENACOL ®EX821 | polyethylene glycol type epoxy resin | | | | 10 |
| | material [B] | Kane Ace ®MX-125 master batch containing 25 mass % core-shell type particulate rubber | component [B]: core-shell type particulate rubber | | 8 | 8 | |
| | | | bisphenol A type epoxy resin | | 24 | 24 | |
| | | Kane Ace ®MX-150 master batch containing 40 mass % core-shell type particulate rubber | component [B]: core-shell type particulate rubber | 10 | | | |
| | | | bisphenol A type epoxy resin | 15 | | | |
| | | Kane Ace ®MX-267 master batch containing 37 mass % core-shell type particulate rubber | component [B]: core-shell type particulate rubber | | | | 10 |
| | | | bisphenol F type epoxy resin | | | | 17 |
| | component [C] | DICY7T | dicyandiamide | 7.0 | 6.0 | 6.0 | 6.5 |
| | curing accelerator | Omicure ®U-24 | toluene bisdimethylurea | 2 | 2 | 2 | 2 |
| | material [D] | Cureduct ®L-07E | component [D]: borate ester compound | | 0.1 | | |
| | | | bisphenol A type epoxy resin | | 0.1 | | |
| | | | phenol novolac resin | | 1.8 | | |
| | thermoplastic resin | Vinylec ®K | polyvinyl formal | 3 | 4 | | 3 |
| | | Nanostrength ®M22N | component (E): triblock copolymer | | | 9 | |
| | number of moles of active groups in epoxy resin/number of moles of active hydrogens in component [C] | | | 1.14 | 1.02 | 1.02 | 1.02 |
| | number of parts by mass of component [D]/number of parts by mass of component [B] | | | — | 0.013 | — | — |
| Physical properties of cured resin | flexural modulus (GPa) | | | 3.0 | 2.6 | 2.6 | 2.7 |
| | flexural strength (MPa) | | | 125 | 109 | 108 | 113 |
| | flexural fracture strain (%) | | | 11 | 13 | 14 | 12 |
| | tensile modulus (GPa) | | | 3.1 | 2.6 | 2.7 | 2.7 |
| | tensile strength (MPa) | | | 70 | 55 | 60 | 58 |
| | tensile fracture strain (%) | | | 7.1 | 7.8 | 8.4 | 8.2 |
| | resin toughness K1c (MPa · $m^{1/2}$) | | | 1.6 | 1.9 | 1.9 | 1.6 |
| | glass transition temperature (° C.) | | | 163 | 150 | 150 | 155 |
| | rubber region G' (MPa) | | | 13.8 | 9.5 | 9.8 | 12.7 |

TABLE 2

| Components of epoxy resin composition | | | | Example 9 | Example 10 | Example 11 | Example 12 |
|---|---|---|---|---|---|---|---|
| Epoxy resin composition | component [A] | Epiclon ®HP7200 | dicyclopentadiene type epoxy resin | 15 | 15 | 55 | |
| | | Epiclon ®HP7200HHH | dicyclopentadiene type epoxy resin | | | | 45 |
| | | NC-3000 | biphenyl aralkyl type epoxy resin | 30 | 30 | | |
| | | NC-7300L | naphthalene aralkyl type epoxy resin | | | | |
| | other epoxy resin | jER ®828 | bisphenol A type epoxy resin | 29.55 | 12.5 | | 8 |
| | | jER ®1001 | | | 23 | 14.7 | |
| | | Epiclon ®830 | bisphenol F type epoxy resin | 8 | | | |
| | | Epotohto ®YDF2001 | | | | | |
| | | Epiclon ®N740 | phenol novolac type epoxy resin | | | | 13 |
| | | Araldite ®MY0600 | trifunctional aminophenol type epoxy resin | | | | |
| | component [F] | DENACOL ®EX821 | polyethylene glycol type epoxy resin | | | | 7 |
| | | DENACOL ®ED506 | polypropylene glycol type epoxy resin | | 1.5 | 3 | |
| | material [B] | Kane Ace ®MX-125 master batch containing 25 mass % core-shell type particulate rubber | component [B]: core-shell type particulate rubber | | | 9 | 9 |
| | | | bisphenol A type epoxy resin | | | 27 | 27 |
| | | Kane Ace ®MX-150 master batch containing 40 mass % core-shell type particulate rubber | component [B]: core-shell type particulate rubber | | 12 | | |
| | | | bisphenol A type epoxy resin | | 18 | | |
| | | Kane Ace ®MX-267 master batch containing 37 mass % core-shell type particulate rubber | component [B]: core-shell type particulate rubber | 10 | | | |
| | | | bisphenol F type epoxy resin | 17 | | | |
| | | Kane Ace ®MX-EXP (HM5) master batch containing 30 mass % core-shell type particulate rubber | component [B]: core-shell type particulate rubber | | | | |
| | | | bisphenol A type epoxy resin | | | | |
| | component [C] | DICY7T | dicyandiamide | 5.5 | 4.5 | 5.0 | 5.5 |
| | curing accelerator | Omicure ®U-24 | toluene bisdimethylurea | 2 | 2 | 2 | 2 |
| | material [D] | Cureduct ®L-07E | component [D]: borate ester compound | 0.45 | | 0.3 | |
| | | | bisphenol A type epoxy resin | 0.45 | | 0.3 | |
| | | | phenol novolac resin | 8.1 | | 5.4 | |
| | thermoplastic resin | Vinylec ®K | polyvinyl formal | | | 2 | |
| | | Nanostrength ®M22N | component (E): triblock copolymer | 2 | 2 | | 6 |
| | number of moles of active groups in epoxy resin/number of moles of active hydrogens in component [C] | | | 0.97 | 0.98 | 1.05 | 1.01 |
| | number of parts by mass of component [D]/number of parts by mass of component [B] | | | 0.045 | — | 0.033 | — |
| Physical properties of cured resin | flexural modulus (GPa) | | | 2.7 | 2.5 | 2.7 | 2.6 |
| | flexural strength (MPa) | | | 115 | 105 | 114 | 108 |
| | flexural fracture strain (%) | | | 13 | 14 | 13 | 14 |
| | tensile modulus (GPa) | | | 2.7 | 2.5 | 2.7 | 2.6 |
| | tensile strength (MPa) | | | 58 | 53 | 58 | 56 |
| | tensile fracture strain (%) | | | 8.3 | 9.2 | 8.8 | 9.9 |
| | resin toughness K1c (MPa · $m^{1/2}$) | | | 2.2 | 1.9 | 1.9 | 2.0 |
| | glass transition temperature (° C.) | | | 146 | 145 | 152 | 153 |
| | rubber region G' (MPa) | | | 9.2 | 8.2 | 8.5 | 9.2 |

| Components of epoxy resin composition | | | | Example 13 | Example 14 | Example 15 | Example 16 |
|---|---|---|---|---|---|---|---|
| Epoxy resin composition | component [A] | Epiclon ®HP7200 | dicyclopentadiene type epoxy resin | | 60 | | |
| | | Epiclon ®HP7200HHH | dicyclopentadiene type epoxy resin | 45 | | 45 | 45 |
| | | NC-3000 | biphenyl aralkyl type epoxy resin | | | | |
| | | NC-7300L | naphthalene aralkyl type epoxy resin | | | | |
| | other epoxy resin | jER ®828 | bisphenol A type epoxy resin | 14.8 | | 24.8 | 16.8 |
| | | jER ®1001 | | | | 10 | |
| | | Epiclon ®830 | bisphenol F type epoxy resin | | 19.8 | | |
| | | Epotohto ®YDF2001 | | 10 | | | |
| | | Epiclon ®N740 | phenol novolac type epoxy resin | 15 | | | |
| | | Araldite ®MY0600 | trifunctional aminophenol type epoxy resin | | | | 10 |
| | component [F] | DENACOL ®EX821 | polyethylene glycol type epoxy resin | | 5 | | |
| | | DENACOL ®ED506 | polypropylene glycol type epoxy resin | | | 5 | 5 |
| | material [B] | Kane Ace ®MX-125 master batch containing 25 mass % core-shell type particulate rubber | component [B]: core-shell type particulate rubber | | | | |
| | | | bisphenol A type epoxy resin | | | | |
| | | Kane Ace ®MX-150 master batch containing 40 mass % core-shell type particulate rubber | component [B]: core-shell type particulate rubber | 10 | 10 | 10 | |
| | | | bisphenol A type epoxy resin | 15 | 15 | 15 | |

TABLE 2-continued

| | | | | | | | |
|---|---|---|---|---|---|---|---|
| | | Kane Ace ®MX-267 master batch containing 37 mass % core-shell type particulate rubber | component [B]: core-shell type particulate rubber<br>bisphenol F type epoxy resin | | | | |
| | | Kane Ace ®MX-EXP (HM5) master batch containing 30 mass % core-shell type particulate rubber | component [B]: core-shell type particulate rubber<br>bisphenol A type epoxy resin | | | | 10<br>23 |
| | component [C] | DICY7T | dicyandiamide | 5.0 | 5.5 | 5.0 | 6.0 |
| | curing accelerator | Omicure ®U-24 | toluene bisdimethylurea | 2 | 2 | 2 | 2 |
| | material [D] | Cureduct ®L-07E | component [D]: borate ester compound | 0.20 | 0.2 | 0.2 | 0.2 |
| | | | bisphenol A type epoxy resin | 0.2 | 0.2 | 0.2 | 0.2 |
| | | | phenol novolac resin | 3.6 | 3.6 | 3.6 | 3.6 |
| | thermoplastic resin | Vinylec ®K | polyvinyl formal | | | | |
| | | Nanostrength ®M22N | component (E): triblock copolymer | 6 | 4 | 6 | 6 |
| | number of moles of active groups in epoxy resin/number of moles of active hydrogens in component [C] | | | 1.00 | 1.01 | 1.02 | 1.04 |
| | number of parts by mass of component [D]/number of parts by mass of component [B] | | | 0.020 | 0.020 | 0.020 | 0.020 |
| Physical properties of cured resin | flexural modulus (GPa) | | | 2.6 | 2.7 | 2.6 | 3.3 |
| | flexural strength (MPa) | | | 107 | 113 | 109 | 145 |
| | flexural fracture strain (%) | | | 13 | 14 | 14 | 13 |
| | tensile modulus (GPa) | | | 2.6 | 2.7 | 2.7 | 3.3 |
| | tensile strength (MPa) | | | 55 | 59 | 60 | 80 |
| | tensile fracture strain (%) | | | 8.8 | 10.5 | 10.2 | 9.5 |
| | resin toughness K1c (MPa · $m^{1/2}$) | | | 2.4 | 2.5 | 2.5 | 1.9 |
| | glass transition temperature (° C.) | | | 152 | 151 | 154 | 157 |
| | rubber region G' (MPa) | | | 9.9 | 8.6 | 9.2 | 9.9 |

TABLE 3

| Components of epoxy resin composition | | | | Comparative example 1 | Comparative example 2 | Comparative example 3 |
|---|---|---|---|---|---|---|
| Epoxy resin composition | component [A] | Epiclon ®HP4700 | bisnaphthalene type epoxy resin | | 45 | |
| | | Epiclon ®HP7200HHH | dicyclopentadiene type epoxy resin | | | |
| | | EXA7200LL | dicyclopentadiene type epoxy resin | | | 60 |
| | | NC-3000 | biphenyl aralkyl type epoxy resin | | | |
| | | NC-7300L | naphthalene aralkyl type epoxy resin | | | |
| | other epoxy resin | jER ®828 | bisphenol A type epoxy resin | 7 | 47 | 40 |
| | | jER ®1001 | | 40 | | |
| | | Epiclon ®N740 | phenol novolac type epoxy resin | | | |
| | | Sumiepoxy ®ELM434 | tetrafunctional glycidyl amine type epoxy resin | 10 | | |
| | | jER ®1031S | tetrakis phenol ethane type epoxy resin | | | |
| | | DENACOL ®EX-201 | resorcinol diglycidyl ether | 20 | | |
| | | DENACOL ®EX-411 | pentaerythritol polydiglycidyl ether | | 8 | |
| | | SR-14BL | 1,4-butanediol diglycidyl ether | | | |
| | | Epiclon ®HP4032H | naphthalene type epoxy resin | 23 | | |
| | material [B] | Kane Ace ®MX-125 master batch containing 25 mass % core-shell type particulate rubber | component [B]: core-shell type particulate rubber<br>bisphenol A type epoxy resin | | | |
| | | Kane Ace ®MX-150 master batch containing 40 mass % core-shell type particulate rubber | component [B]: core-shell type particulate rubber<br>bisphenol A type epoxy resin | | | |
| | | Kane Ace ®MX-154 master batch containing 40 mass % core-shell type particulate rubber | component [B]: core-shell type particulate rubber<br>bisphenol A type epoxy resin | | | |
| | | Stafiloid IM-101 | component [B]: core-shell particulate rubber | 5 | | |
| | component [C] | DICY7T | dicyandiamide | 3.5 | 6.0 | 3.5 |
| | curing accelerator | DCMU99 | dichlorophenyl dimethylurea | 3 | 2 | 4 |
| | | Omicure ®U-24 | toluene bisdimethylurea | | | |
| | thermoplastic resin | Vinylec ®K | polyvinyl formal | 10 | | |
| | other component | Hycar CTBN1300 × 8 | carboxyl terminated butadiene-nitrile rubber | | | 10 |
| | number of moles of active groups in epoxy resin/number of moles of active hydrogens in component [C] | | | 0.62 | 0.90 | 0.69 |
| | number of parts by mass of component [D]/number of parts by mass of component [B] | | | — | — | — |

TABLE 3-continued

| | | | | |
|---|---|---|---|---|
| Physical properties of cured resin | flexural modulus (GPa) | 3.3 | 3.4 | 2.7 |
| | flexural strength (MPa) | 143 | 146 | 114 |
| | flexural fracture strain (%) | 13 | 8 | 8 |
| | tensile modulus (GPa) | 3.3 | 3.4 | 2.7 |
| | tensile strength (MPa) | 64 | 56 | 53 |
| | tensile fracture strain (%) | 10.0 | 3.3 | 5.1 |
| | resin toughness K1c (MPa · $m^{1/2}$) | 1.6 | 0.8 | 1.4 |
| | glass transition temperature (° C.) | 119 | 164 | 134 |
| | rubber region G' (MPa) | 5.9 | 14.4 | 5.3 |

| Components of epoxy resin composition | | | | Comparative example 4 | Comparative example 5 |
|---|---|---|---|---|---|
| Epoxy resin composition | component [A] | Epiclon ®HP4700 | bisnaphthalene type epoxy resin | | |
| | | Epiclon ®HP7200HHH | dicyclopentadiene type epoxy resin | | |
| | | EXA7200LL | dicyclopentadiene type epoxy resin | | |
| | | NC-3000 | biphenyl aralkyl type epoxy resin | 50 | 50 |
| | | NC-7300L | naphthalene aralkyl type epoxy resin | | |
| | other epoxy resin | jER ®828 | bisphenol A type epoxy resin | 40 | 34 |
| | | jER ®1001 | | | |
| | | Epiclon ®N740 | phenol novolac type epoxy resin | 10 | 10 |
| | | Sumiepoxy ®ELM434 | tetrafunctional glycidyl amine type epoxy resin | | |
| | | jER ®1031S | tetrakis phenol ethane type epoxy resin | | |
| | | DENACOL ®EX-201 | resorcinol diglycidyl ether | | |
| | | DENACOL ®EX-411 | pentaerythritol polydiglycidyl ether | | |
| | | SR-14BL | 1,4-butanediol diglycidyl ether | | |
| | | Epiclon ®HP4032H | naphthalene type epoxy resin | | |
| | material [B] | Kane Ace ®MX-125 master batch containing 25 mass % core-shell type particulate rubber | component [B]: core-shell type particulate rubber | | |
| | | | bisphenol A type epoxy resin | | |
| | | Kane Ace ®MX-150 master batch containing 40 mass % core-shell type particulate rubber | component [B]: core-shell type particulate rubber | | 4 |
| | | | bisphenol A type epoxy resin | | 6 |
| | | Kane Ace ®MX-154 master batch containing 40 mass % core-shell type particulate rubber | component [B]: core-shell type particulate rubber | | |
| | | | bisphenol A type epoxy resin | | |
| | | Stafiloid IM-101 | component [B]: core-shell particulate rubber | | |
| | component [C] | DICY7T | dicyandiamide | 5.0 | 5.0 |
| | curing accelerator | DCMU99 | dichlorophenyl dimethylurea | | |
| | | Omicure ®U-24 | toluene bisdimethylurea | 2 | 2 |
| | thermoplastic resin | Vinylec ®K | polyvinyl formal | 3 | 3 |
| | other component | Hycar CTBN1300 × 8 | carboxyl terminated butadiene-nitrile rubber | | |
| | number of moles of active groups in epoxy resin/number of moles of active hydrogens in component [C] | | | 0.93 | 0.93 |
| | number of parts by mass of component [D]/number of parts by mass of component [B] | | | — | — |
| Physical properties of cured resin | flexural modulus (GPa) | | | 3.6 | 3.1 |
| | flexural strength (MPa) | | | 153 | 129 |
| | flexural fracture strain (%) | | | 7 | 10 |
| | tensile modulus (GPa) | | | 3.6 | 3.1 |
| | tensile strength (MPa) | | | 72 | 62 |
| | tensile fracture strain (%) | | | 2.9 | 5.0 |
| | resin toughness K1c (MPa · $m^{1/2}$) | | | 0.8 | 1.3 |
| | glass transition temperature (° C.) | | | 146 | 146 |
| | rubber region G' (MPa) | | | 9.0 | 9.0 |

| Components of epoxy resin composition | | | | Comparative example 6 | Comparative example 7 | Comparative example 8 |
|---|---|---|---|---|---|---|
| Epoxy resin composition | component [A] | Epiclon ®HP4700 | bisnaphthalene type epoxy resin | | | |
| | | Epiclon ®HP7200HHH | dicyclopentadiene type epoxy resin | | 30 | |
| | | EXA7200LL | dicyclopentadiene type epoxy resin | | | |
| | | NC-3000 | biphenyl aralkyl type epoxy resin | 50 | | |
| | | NC-7300L | naphthalene aralkyl type epoxy resin | | | 55 |
| | other epoxy resin | jER ®828 | bisphenol A type epoxy resin | 10 | 6 | 7 |
| | | jER ®1001 | | | 40 | |
| | | Epiclon ®N740 | phenol novolac type epoxy resin | 10 | | |
| | | Sumiepoxy ®ELM434 | tetrafunctional glycidyl amine type epoxy resin | | | |

TABLE 3-continued

| | | | | | | |
|---|---|---|---|---|---|---|
| | | jER ®1031S | tetrakis phenol ethane type epoxy resin | | | 20 |
| | | DENACOL ®EX-201 | resorcinol diglycidyl ether | | | |
| | | DENACOL ®EX-411 | pentaerythritol polydiglycidyl ether | | | |
| | | SR-14BL | 1,4-butanediol diglycidyl ether | | | |
| | | Epiclon ®HP4032H | naphthalene type epoxy resin | | | |
| | material [B] | Kane Ace ®MX-125 master batch containing 25 mass % core-shell type particulate rubber | component [B]: core-shell type particulate rubber | | 8 | 6 |
| | | | bisphenol A type epoxy resin | | 24 | 18 |
| | | Kane Ace ®MX-150 master batch containing 40 mass % core-shell type particulate rubber | component [B]: core-shell type particulate rubber | 20 | | |
| | | | bisphenol A type epoxy resin | 30 | | |
| | | Kane Ace ®MX-154 master batch containing 40 mass % core-shell type particulate rubber | component [B]: core-shell type particulate rubber | | | |
| | | | bisphenol A type epoxy resin | | | |
| | | Stafiloid IM-101 | component [B]: core-shell particulate rubber | | | |
| | component [C] | DICY7T | dicyandiamide | 5.0 | 4.0 | 6.0 |
| | curing | DCMU99 | dichlorophenyl dimethylurea | | | |
| | accelerator | Omicure ®U-24 | toluene bisdimethylurea | 2 | 2 | 2 |
| | thermoplastic resin | Vinylec ®K | polyvinyl formal | 3 | | |
| | other component | Hycar CTBN1300 × 8 | carboxyl terminated butadiene-nitrile rubber | | | |
| | number of moles of active groups in epoxy resin/number of moles of active hydrogens in component [C] | | | 0.93 | 0.96 | 0.98 |
| | number of parts by mass of component [D]/number of parts by mass of component [B] | | | — | — | — |
| Physical properties of cured resin | flexural modulus (GPa) | | | 2.2 | 2.4 | 2.8 |
| | flexural strength (MPa) | | | 95 | 102 | 118 |
| | flexural fracture strain (%) | | | 10 | 13 | 7 |
| | tensile modulus (GPa) | | | 2.1 | 2.4 | 2.8 |
| | tensile strength (MPa) | | | 42 | 49 | 51 |
| | tensile fracture strain (%) | | | 5.7 | 8.0 | 3.4 |
| | resin toughness K1c (MPa · $m^{1/2}$) | | | 1.6 | 1.7 | 1.4 |
| | glass transition temperature (° C.) | | | 145 | 130 | 163 |
| | rubber region G' (MPa) | | | 8.9 | 6.7 | 17.1 |

| Components of epoxy resin composition | | | | Comparative example 9 | Comparative example 10 |
|---|---|---|---|---|---|
| Epoxy resin composition | component [A] | Epiclon ®HP4700 | bisnaphthalene type epoxy resin | | |
| | | Epiclon ®HP7200HHH | dicyclopentadiene type epoxy resin | | 17 |
| | | EXA7200LL | dicyclopentadiene type epoxy resin | | |
| | | NC-3000 | biphenyl aralkyl type epoxy resin | | |
| | | NC-7300L | naphthalene aralkyl type epoxy resin | | |
| | other epoxy resin | jER ®828 | bisphenol A type epoxy resin | 20 | 70 |
| | | jER ®1001 | | | |
| | | Epiclon ®N740 | phenol novolac type epoxy resin | 50 | |
| | | Sumiepoxy ®ELM434 | tetrafunctional glycidyl amine type epoxy resin | | |
| | | jER ®1031S | tetrakis phenol ethane type epoxy resin | | |
| | | DENACOL ®EX-201 | resorcinol diglycidyl ether | | |
| | | DENACOL ®EX-411 | pentaerythritol polydiglycidyl ether | | |
| | | SR-14BL | 1,4-butanediol diglycidyl ether | | 5 |
| | | Epiclon ®HP4032H | naphthalene type epoxy resin | | |
| | material [B] | Kane Ace ®MX-125 master batch containing 25 mass % core-shell type particulate rubber | component [B]: core-shell type particulate rubber | 10 | |
| | | | bisphenol A type epoxy resin | 30 | |
| | | Kane Ace ®MX-150 master batch containing 40 mass % core-shell type particulate rubber | component [B]: core-shell type particulate rubber | | |
| | | | bisphenol A type epoxy resin | | |
| | | Kane Ace ®MX-154 master batch containing 40 mass % core-shell type particulate rubber | component [B]: core-shell type particulate rubber | | 5.5 |
| | | | bisphenol A type epoxy resin | | 8 |
| | | Stafiloid IM-101 | component [B]: core-shell particulate rubber | | |
| | component [C] | DICY7T | dicyandiamide | 6.5 | 5.0 |
| | curing | DCMU99 | dichlorophenyl dimethylurea | | 2 |
| | accelerator | Omicure ®U-24 | toluene bisdimethylurea | 2 | |
| | thermoplastic resin | Vinylec ®K | polyvinyl formal | 5 | |
| | other component | Hycar CTBN1300 × 8 | carboxyl terminated butadiene-nitrile rubber | | |

TABLE 3-continued

| | | | |
|---|---|---|---|
| | number of moles of active groups in epoxy resin/number of moles of active hydrogens in component [C] | 1.00 | 0.88 |
| | number of parts by mass of component [D]/number of parts by mass of component [B] | — | — |
| Physical properties of cured resin | flexural modulus (GPa) | 2.7 | 2.7 |
| | flexural strength (MPa) | 113 | 111 |
| | flexural fracture strain (%) | 8 | 10 |
| | tensile modulus (GPa) | 2.7 | 2.7 |
| | tensile strength (MPa) | 50 | 77 |
| | tensile fracture strain (%) | 3.6 | 6.8 |
| | resin toughness K1c (MPa · $m^{1/2}$) | 1.4 | 1.6 |
| | glass transition temperature (° C.) | 153 | 133 |
| | rubber region G' (MPa) | 20.2 | 6.8 |

Here, in Tables, the quantity of each component is shown in parts by mass.

INDUSTRIAL APPLICABILITY

The epoxy resin composition according to the present invention can form a cured epoxy resin having high elastic modulus, deformability, fracture toughness, and heat resistance in a good balance, and therefore, fiber-reinforced composite materials produced from the epoxy resin composition are high in heat resistance, mechanical properties, and impact absorption property. Therefore, these fiber-reinforced composite materials can be light in weight and at the same time can serve for a variety of applications in many fields such as sporting goods, general industrial materials, and aerospace materials.

The invention claimed is:

1. An epoxy resin composition comprising components [A], [B], [C] and [D] and satisfying requirements (1), (2), and (3) and (4):

[A]: at least one epoxy resin selected from the group consisting of a bisnaphthalene epoxy resin, a dicyclopentadiene epoxy resin, a biphenyl aralkyl epoxy resin, and a naphthalene aralkyl epoxy resin,

[B]: a core-shell type particulate rubber,

[C]: dicyandiamide, and

[D]: a borate ester, wherein:

(1) the component [B] accounts for 6 to 18 parts by mass relative to the total quantity of epoxy resins, which accounts for 100 parts by mass, (2) a cured epoxy resin produced by curing the epoxy resin composition at 135° C. for 2 hours shows a rubbery state elastic modulus G' in a range of 8 MPa<G'<15 MPa as determined by dynamic viscoelasticity analysis, (3) the cured epoxy resin shows a tensile fracture strain of 7% or more, and (4) the component [D] satisfies:

$$0.003 \leq (\text{number of parts by mass of component } [D] / \text{number of parts by mass of component } [B]) \leq 0.05.$$

2. The epoxy resin composition as set forth in claim 1, wherein the component [A] satisfies either requirement (a) or (b) relative to the total quantity of all epoxy resins, which accounts for 100 parts by mass:

(a) component [A] contains 20 to 60 parts by mass of the dicyclopentadiene epoxy resin, or (b) component [A] contains 20 to 50 parts by mass of the bisnaphthalene epoxy resin.

3. The epoxy resin composition as set forth in claim 1, further comprising 2 to 10 parts by mass of a triblock copolymer as a component [E] relative to the total quantity of all epoxy resins, which accounts for 100 parts by mass.

4. The epoxy resin composition as set forth in claim 1, further comprising 1 to 10 parts by mass of a difunctional aliphatic epoxy resin as a component [F] relative to the total quantity of all epoxy resins, which accounts for 100 parts by mass:

[F]: a difunctional aliphatic epoxy resin as represented by formula (I), (I)

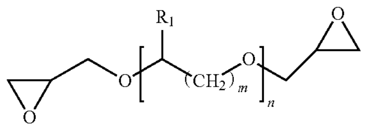

wherein:

$R_1$ is a hydrogen atom or a methyl group, and n and m each represent an integer of 1 to 8.

5. The epoxy resin composition as set forth in claim 1, wherein the number of moles of active epoxy groups in all the epoxy resins, which account for 100 parts by mass (Ma) and the number of moles of active hydrogens in the component [C] (Mc) satisfy:

$$0.95 \leq Ma/Mc \leq 1.05.$$

6. A prepreg comprising the epoxy resin composition as set forth in claim 1 and reinforcing fibers.

7. A fiber-reinforced composite material produced by curing the prepreg as set forth in claim 6.

* * * * *